United States Patent [19]

McDaniel

[11] 4,324,769
[45] Apr. 13, 1982

[54] EXTRACTION AND PRODUCTION OF ALUMINA CONTAINING LESS THAN 0.03 PERCENT IRON OXIDE

[75] Inventor: James W. McDaniel, Baton Rouge, La.

[73] Assignee: Alumina Development Corporation, Baton Rouge, La.

[21] Appl. No.: 199,135

[22] Filed: Oct. 22, 1980

Related U.S. Application Data

[63] Continuation-in-part of Ser. No. 80,183, Oct. 1, 1979, abandoned.

[51] Int. Cl.$^3$ .......................... C01F 7/06; C01F 7/20; C01F 7/34
[52] U.S. Cl. .................................... 423/121; 423/127
[58] Field of Search ............................. 423/121, 127

[56] References Cited

U.S. PATENT DOCUMENTS 2,701,751 2/1955 Porter ................................. 423/121
2,852,343 9/1958 Scandrett et al. .................... 423/121

FOREIGN PATENT DOCUMENTS 269395 6/1964 Australia .............................. 423/121

Primary Examiner—Gary P. Straub
Attorney, Agent, or Firm—Roy, Kiesel, Patterson & McKay

[57] ABSTRACT

A wet caustic aluminate process that comprises digesting a bauxite at a low temperature in caustic aluminate liquor to extract the alumina trihydrate, separating the supersaturated caustic aluminate liquor of low $Fe_2O_3$ content from the mud, digesting the mud or a mixture of mud and bauxite at a higher temperature in caustic aluminate liquor to extract the majority of the remaining monohydrate and trihydrate, separating the supersaturated caustic aluminate liquor of higher $Fe_2O_3$ content from the residue, precipitating alumina hydrate from the two supersaturated caustic aluminate liquors, recyling spent caustic aluminate liquor to digestion and calcining alumina hydrate to alumina with a $Fe_2O_3$ content less than 0.03%.

6 Claims, 3 Drawing Figures

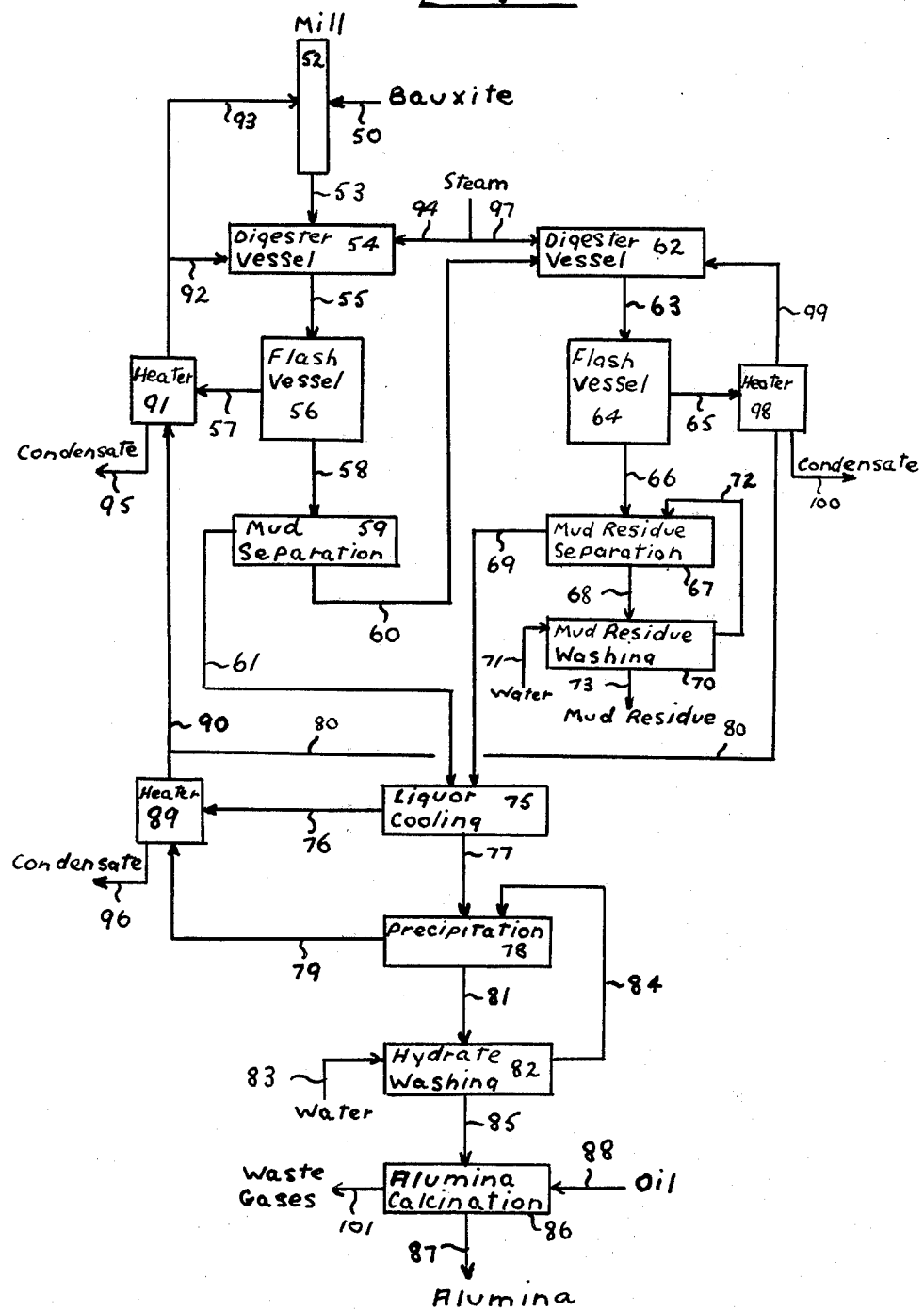

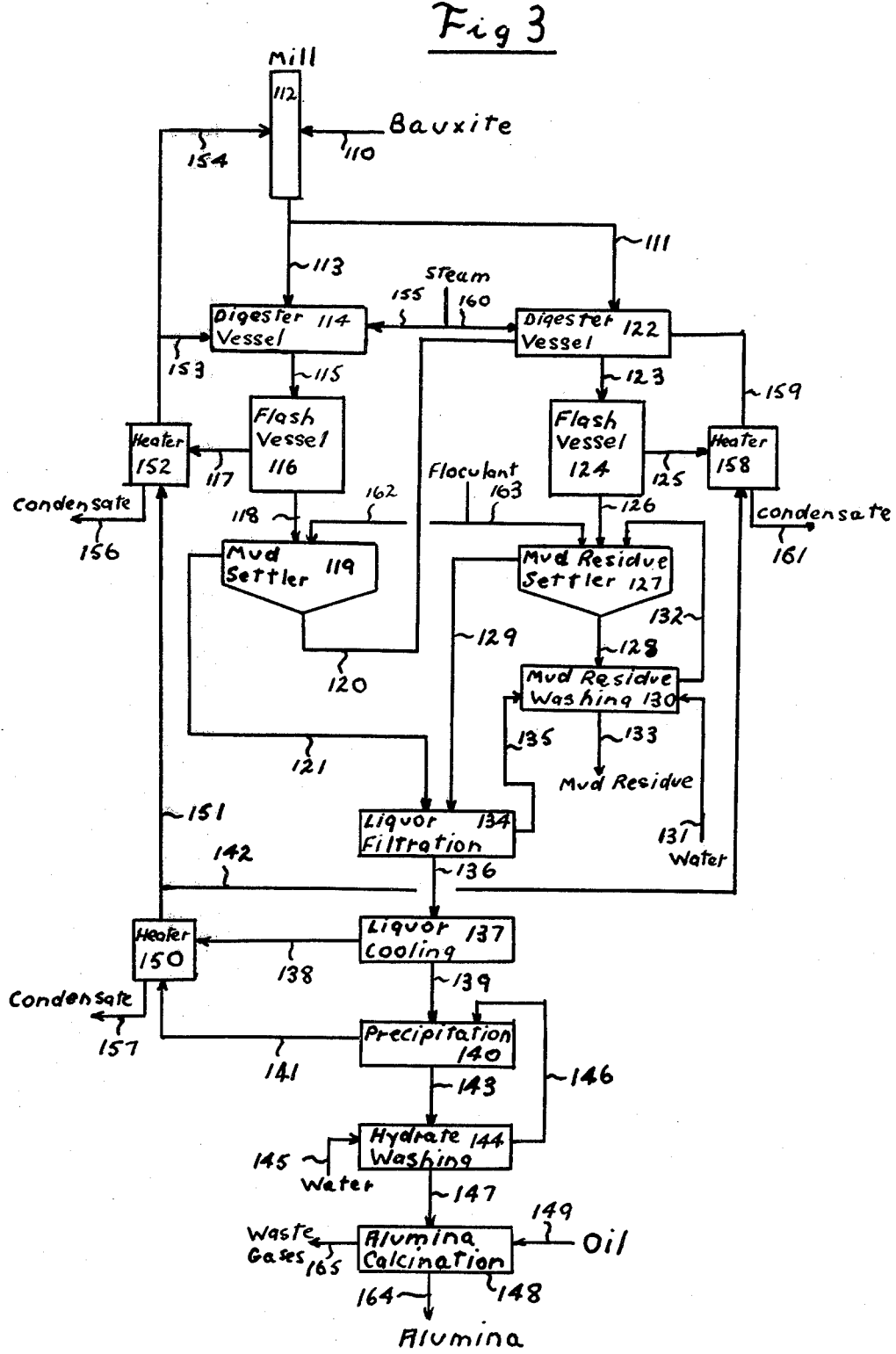

EXTRACTION AND PRODUCTION OF ALUMINA CONTAINING LESS THAN 0.03 PERCENT IRON OXIDE

RELATED APPLICATIONS

This is a continuation-in-part of U.S. patent application Ser. No. 080,183, filed Oct. 1, 1979, now abandoned by the inventor herein and entitled "Extraction and Production of Alumina Containing Less Than 0.03% Iron Oxide," mention being made herein specifically to obtain benefit of its earlier filing date.

BACKGROUND OF THE INVENTION

1. Field of the Invention

The present invention is directed to a novel method based on the Bayer process of extraction of alumina from aluminous ores such as bauxite and is applicable to the recovery and production of alumina with a low iron oxide content, from aluminous ores wherein the alumina is predominately in the form of alumina trihydrate but a substantial portion of the total alumina is in the form of monohydrate.

2. Prior Art

The Bayer process is a wet alkali aluminate method and generally involved digesting aluminous ores such as bauxite in spent caustic aluminate liquor at elevated temperatures to extract the available alumina from the ore, thereby producing a slurry containing an enriched caustic aluminate liquor called green liquor and an ore residue called mud. The green liquor is supersaturated with alumina.

The slurry from the digestion operation is generally flash cooled to atmospheric conditions and then subjected to clarification and/or filtration operations whereby the supersaturated liquor is separated from the insoluble ore residue. The ore residue or mud is washed to recover entrained caustic aluminate liquor and then discarded. The supersaturated caustic aluminate liquor is further cooled and the alumina precipitated as alumina trihydrate by seeding with previously precipitated alumina trihydrate. Generally 50% of the dissolved alumina contents of the supersaturated caustic aluminate liquor is precipitated as alumina trihydrate, the remaining portion of the alumina being retained by the liquor which is recycled to digestion as spent caustic aluminate liquor called spent liquor. The precipitated alumina trihydrate is filtered, washed with water and calcined at about 1000° to 1200° C. to produce 99% purity alumina.

Hydrated alumina in bauxites exists generally in the form of gibbsite which is alumina trihydrate ($Al_2O_3.3H_2O$) and boehmite which is alumina monohydrate ($Al_2O_3.H_2O$). The difference in solubility of alumina trihydrate and alumina monohydrate in caustic soda and aluminate liquors leads to the use of differing conditions in the digestion process.

Alumina monohydrate is not as easily dissolved as alumina trihydrate and requires either a high caustic concentration, a higher digestion temperature, or a lower alumina to caustic ratio to dissolve an equal quantity of alumina as the alumina trihydrate. When the caustic concentration or temperature are increased in the digestion operation, ferrous iron is formed and exists either in a colloidal or soluble state and is difficult to remove at the clarification and filtration operations. Ferrous iron that is not removed from the green or supersaturated liquor becomes part of the finished alumina and can be a serious contaminant.

Iron oxide is a contaminant in alumina and buyers will generally pay a premium price for alumina containing less than 0.02% $Fe_2O_3$. On the other hand, if the alumina contains more than 0.03% of $Fe_2O_3$, it can be difficult to sell.

Examples of various alternate Bayer processes can be seen in U.S. Pat. Nos. 2,701,751 and 2,852,343, utilizing a dual digester system. However, energy efficiency and iron oxide content still remain a problem. To overcome this difficulty, several prior art methods are known for lowering the iron oxide content of alumina such as filtering the green liquor through a bed of iron grit as in U.S. Pat. No. 3,729,542 or using a bauxite bed as in U.S. Pat. No. 3,728,432. U.S. Pat. No. 4,083,925 lowers the iron oxide content of alumina by adding a high molecular polyacrylamide reagent to the mud settling operation and U.S. Pat. No. 3,607,140 co-precipitates the iron impurities in the liquor with a limited amount of alumina hydrate.

The equipment cost of a high temperature digestion unit can be twice the cost of a low temperature digestion unit and the energy and operating costs are also greater due to the additional number of heaters, flash tanks and pumps required for high temperature digestion. For this reason, a low temperature digestion unit operating at 100° to 150° C. is generally installed if the bauxite contains less than 5% alumina monohydrate. Since 90 to 97% of the alumina trihydrate is extracted, the alumina monohydrate is simply discarded in the mud to keep recovery cost down. However, if the bauxite contains more than 5% alumina monohydrate, a high temperature digestion unit operating at 200° to 300° C. is generally installed to extract 90 to 97% of the alumina monohydrate and trihydrate.

SUMMARY OF THE INVENTION

The principal object of this invention is to provide a method to extract alumina trihydrate and alumina monohydrate from bauxites and produce alumina containing less than 0.03% $Fe_2O_3$.

A further object of this invention is to extract at low temperatures the alumina trihydrate from a bauxite, separate the green liquor of low $Fe_2O_3$ content from the mud, digest the mud at a high temperature to extract the alumina monohydrate, separate the green liquor of higher $Fe_2O_3$ content from the mud residue, precipitate the alumina trihydrate from the two green liquors and calcine the alumina trihydrate to alumina containing less than 0.03% $Fe_2O_3$.

A still further object of this invention is to digest mud and extract alumina predominately in the monohydrate form.

A still further object of this invention is to digest mud mixed with a proportion of ore where the ore is from one-tenth to ten times the weight of mud and extract the alumina monohydrate and alumina trihydrate from the mixture.

A still further object of this invention is to increase the production of an alumina plant by the amount of alumina monohydrate extracted from the digested mud.

A still further object of this invention is to increase the extraction efficiency of alumina from an ore.

Other objects and advantages of this invention shall become apparent from the ensuing description of the invention.

Accordingly, a process for producing alumina having an $Fe_2O_3$ content of 0.03% by weight is disclosed comprising digesting at low temperature a mixture of alumina containing ores and spent caustic aluminate liquor to form a supersaturated caustic aluminate liquor stream of low $Fe_2O_3$ content and a mud stream, then filtering, cooling and precipitating alumina hydrate from the supersaturated stream while digesting the mud stream with spent caustic aluminate liquor at higher temperatures to extract alumina monohydrate and alumina trihydrate and aluminate liquor of higher $Fe_2O_3$ content, then filtering, cooling and precipitating the second stream to obtain alumina hydrate and a third stream of spent caustic aluminate liquor which is recycled to the digesting steps, and finally calcining the alumina hydrate to form alumina containing less than 0.03% $Fe_2O_3$.

BRIEF DESCRIPTION OF THE DRAWINGS

FIG. 2 is a schematic representation in flow sheet form showing the preferred embodiments of digestion of bauxite followed by digestion of mud from the bauxite and production of alumina with a $Fe_2O_3$.

FIG. 3 is a schematic representation in flow sheet form showing the preferred embodiments of digestion of bauxite followed by the digestion of a mixture of mud and bauxite and the production of alumina with a $Fe_2O_3$ content less than 0.03%.

PREFERRED EMBODIMENTS OF THE INVENTION

Figure 1:
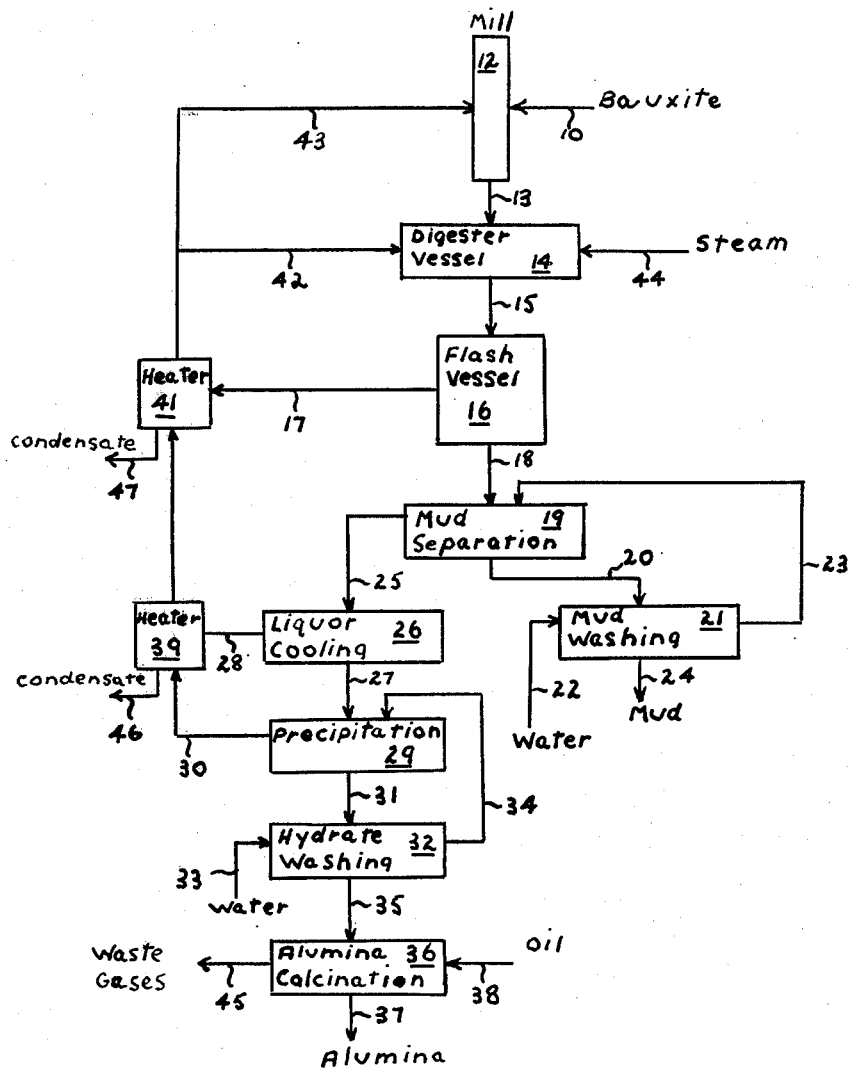
FIG. 1 is a schematic representation in flow sheet form of a commercial alumina plant using the conventional Bayer process.

With particular reference to FIG. 1, therein depicted is a typical flow sheet of a commercial alumina plant using the conventional Bayer process.

In FIG. 1, bauxite enters grinding zone 12 via line 10. Spent caustic aluminate liquor enters grinding zone 12 via line 43. After grinding, the bauxite slurry is conducted via line 13 to pressure digestion zone 14. Hot spent caustic aluminate liquor enters the pressure digestion zone 14 via line 42. Steam can also be added to the pressure digestion zone 14 via line 44. After digestion, the caustic aluminate liquor is supersaturated with alumina and is conducted with the mud as a slurry to flash cooling zone 16 via line 15. Vapor leaves flash cooling zone 16 via line 17 to spent liquor heaters 41, condensate leaves via line 47. The slurry is brought to atmospheric pressure in the flash vessel 16 and then conducted to the mud separation zone 19 via line 18. The mud separation zone 19 consists of thickeners and/or filters and separates the slurry into clear supersaturated caustic aluminate liquor and mud. The mud is conducted via line 20 to the mud washing zone 21 where water is added via line 22. Dilute supersaturated caustic aluminate liquor is returned to the mud separation zone 19 via line 23. Mud is discarded from the mud washing zone 21 via line 24.

The clear supersaturated caustic aluminate liquor or green liquor is conducted from the mud separation zone 19 to the liquor cooling zone 26 via line 25. Flashed vapour leaves the cooling zone 26 to the spent liquor heater 39 via line 28, condensate leaves via line 46. The green liquor can also be cooled using liquid/liquid heat exchangers. The cooled green liquor is conducted to the precipitation zone 29 via line 27. In the precipitation zone 29, the green liquor is seeded with alumina hydrate, agitated until approximately 50% of the soluble alumina is precipitated and then the alumina hydrate and spent caustic aluminate liquor separated. The spent liquor is recycled to the digestion zone via line 30. A portion of the alumina hydrate separated is recycled in the precipitation zone 29 as seed and the remaining portion is conducted to the alumina hydrate washing zone 32 via line 31. Water is added to the alumina hydrate washing zone 32 via line 33 and diluted spent caustic aluminate liquor is returned to the precipitation zone 29 via line 34. Washed alumina hydrate is conducted to the calcination zone 36 via line 35. Oil or gas is conducted to the calcination zone 36 via line 38. Alumina hydrate is calcined at about 1200° C. to alumina and exits the calcination zone 36 via line 37. Waste gases exit the calcination zone 36 via line 45.

With particular reference to FIG. 2, therein is depicted a flow sheet showing the preferred embodiments of the invention as contrasted with the conventional Bayer process.

In FIG. 2, bauxite enters grinding zone 52 via line 50. Spent caustic aluminate liquor enters grinding zone 52 via line 93. After grinding, the bauxite slurry is conducted to pressure digestion zone 54 operating at 100°–230° C., preferably 100°–199° C., via line 53. Hot, spent caustic aluminate liquor enters the pressure digestion zone 54 via line 92. Steam is added to the pressure digestion zone 54 via line 94. It is preferred that the caustic concentration in digestion zone 54 is 100–400 grams per liter, more preferably 100–250 grams per liter, and an alumina to caustic weight ratio of 0.58–0.80 in the supersaturated caustic aluminate liquor. After extracting the alumina trihydrate from the bauxite, the liquor becomes supersaturated with alumina and is conducted with the mud as a slurry to flash cooling zone 56 via line 55. Vapour leaves flash cooling zone 56 via line 57 to spent liquor heater 91. The slurry is brought to atmospheric pressure in the flash vessel 56 and is then conducted to the mud separation zone 59 via line 58. The mud separation zone 59 consists of thickeners and/or filters and separates the slurry into clear supersaturated caustic aluminate liquor and mud. The clear supersaturated caustic aluminate liquor or green liquor is conducted from the mud separation zone 59 to the liquor cooling zone 75 via line 61.

The mud is conducted from the mud separation zone 59 to a second pressure digestion zone 62 operating at 200°–300° C. via line 60. Hot spent caustic aluminate liquor is conducted to pressure digestion zone 62 via line 99 and steam is added via line 97. It is preferred that the caustic concentration in digestion zone 62 is 100–400 grams per liter, more preferably 100–300 grams per liter, and an alumina to caustic weight ratio of 0.58–0.80 in the supersaturated caustic aluminate stream formed. After extracting the alumina monohydrate and any alumina trihydrate remaining in the mud, the liquor becomes supersaturated with alumina and is conducted with the mud residue and as a slurry to a second flash cooling zone 64 via line 63. The slurry is brought to atmospheric pressure in flash vessel 64 and then conducted to a mud residue separation zone 67. The mud residue separation zone 67 consists of thickeners and/or filters and separates the slurry into clear supersaturated caustic aluminate liquor and mud residue. The mud residue is conducted to the mud residue washing zone 70 via line 68 where water is added via line 71. Dilute supersaturated caustic aluminate liquor is returned to the mud residue separation zone 67 via line 72. Mud residue is discarded from mud residue washing zone 70 via line 73.

Clear supersaturated caustic aluminate liquor or green liquor is conducted from the mud residue separation zone 67 to the liquor cooling zone 75 via line 69 and can be combined with the green liquor from the mud separation zone 59. Flashing vapour leaves the cooling zone 75 to the spend liquor heater 89 via line 76. The cooled green liquor is conducted to the precipitation zone 78 via line 77. In the precipitation zone 78 the green liquor is seeded with alumina hydrate, agitated until approximately 50% of the soluble alumina precipitates and then the alumina hydrate and spent caustic aluminate liquor are separated. The spent liquor is recycled to the digestion zones via line 79. A portion of the alumina hydrate separated is recycled in the precipitation zone 78 as seed and the remaining portion is conducted to the alumina hydrate washing zone 82 via line 81. Water is added to the alumina hydrate washing zone 82 via line 83 and dilute spent caustic aluminate liquor returned to the precipitation zone 78 via line 84. Washed alumina hydrate is conducted to the calcination zone 86 via line 85. Oil or gas is conducted to the calcination zone 86 via line 88. Alumina hydrate is calcined at about 1200° C. to alumina and exits the calcination zone 86 via line 87. Waste gases exit the calcination zone 86 via line 101. With particular reference to FIG. 3, there is depicted a flow sheet showing the preferred embodiments of the invention.

Turning now to FIG. 3 an alternate preferred embodiment is shown wherein bauxite enters grinding zone 112 via line 110. Spent caustic aluminate liquor enters grinding zone 112 via line 154. After grinding, the bauxite slurry is conducted to pressure digestion zone 114 via line 113. Hot spent liquor enters pressure digestion zone 114 via line 153. Steam is added to pressure digestion zone 114 via line 155. It is preferred that the caustic concentration in digestion zone 114 is 100–400 grams per liter, more preferably 100–250 grams per liter, and an alumina to caustic weight ratio of 0.58–0.80 in the supersaturated caustic aluminate liquor. After extracting the alumina trihydrate from the bauxite, the liquor becomes supersaturated with alumina and is conducted with the mud as a slurry to flash cooling zone 116 via line 115. Vapour leaves flash cooling zone 116 via line 117 to spent liquor heaters 152. Condensate leaves spent liquor heaters 152 via line 156. The slurry is brought to atmospheric pressure in the flash vessel 116 and is then conducted to the mud settling zone 119 via line 118. Flocculant is added to the mud settling zone 119 via line 162. The mud settler 119 separates the slurry into two streams, supersaturated caustic aluminate liquor which overflows the mud settler and generally contains less than 0.5 grams per liter of suspended solids and mud which settles to between 200 and 500 grams per liter of solids. The supersaturated caustic aluminate liquor or green liquor overflowing the mud settler 119 is conducted to the liquor filteration zone 134 via line 121.

Settled mud is underflowed from the mud settler 119 and is conducted to a second pressure digestion zone 122 via line 120. Bauxite is added to the second pressure digestion zone 122 via line 111. It is preferred that the mud to bauxite weight ratio be 0.1–2.5. Hot spent caustic aluminate liquor is added to the pressure digestion zone 122 via line 159 and steam is added via line 160. It is preferred that the caustic concentration in digestion zone 112 is 100–400 grams per liter, more preferably 100–250 grams per liter, and an alumina to caustic weight ratio of 0.58–0.80 in the supersaturated caustic aluminate liquor. After extracting the alumina monohydrate and alumina trihydrate from the mud and bauxite, the liquor becomes supersaturated with alumina and is conducted with the mud residue and as a slurry to a second flash cooling zone 124 via line 123. The slurry is brought to atmospheric pressure in flash vessel 124 and then conducted to a mud residue settling zone 127 via line 126. Vapour exits the flash cooling zone 124 vial line 125 to spent liquor heaters 158. Floculant is added to the mud residue settling zone 127 via line 162. The mud residue settler 127 separates the slurry into two streams. Supersaturated caustic aluminates liquor which overflows the mud residue settler and generally contains less than 0.5 grams per liter of suspended solids and the mud residue which settles to between 200 and 500 grams per liter of solids. The supersaturated caustic aluminate liquor or green liquor overflowing the mud residue settler 127 is conducted to the liquor filtration zone 134 via line 129. Settled mud residue is underflowed from the mud residue settler 127 and is conducted to the mud residue washing zone 130 via line 128 where water is added via line 131. Dilute supersaturated caustic aluminate liquor is returned to the mud residue settler 127 via line 132. Mud residue is discarded from the mud residue washing zone 130 via line 133.

The liquor filtration zone 134 removes the last traces of suspended solids from the green liquor, and the solids removed are conducted to mud residue washing zone 130 via line 135. Green liquor with less than 0.03 grams per liter of suspended solids is conducted to liquor cooling zone 137 via line 136. Vapour exits the liquor cooling zone 137 via line 138 to spent liquor heater 150. The cooled green liquor is conducted to the precipitation zone 140 via line 139. In the precipitation zone 140, the green liquor is seeded with alumina hydrate, agitated until approximately 50% of the soluble alumina precipitates and then the spent caustic aluminate liquor and alumina hydrate are separate. The spent liquor is recycled to the digestion zone 114 and 122 via line 141. A portion of the alumina hydrate separated is recycled in the precipitation zone 140 as seed and the remaining portion is conducted to the alumina hydrate washing zone 144 via line 143. Water is added to the alumina hydrate washing zone 144 via line 145 and dilute spent caustic aluminate liquor returned to the precipitation zone 140 via line 146. Washed alumina hydrate is conducted to the calcination zone 148 via line 147. Oil and gas is conducted to the calcination zone 148 via line 149. Alumina hydrate is calcined at about 1200° C. to alumina and exits the calcination zone 148 via line 164. Waste gases exit the calcination zone 148 via line 164.

EXAMPLE 1

96.8 grams of a West African bauxite was digested in the laboratory in 1 liter of spent caustic aluminate liquor for a charging A/C ratio of 0.64. The spent caustic aluminate liquor analysed 190 gpl caustic and an alumina to caustic ratio of 0.38. The bauxite contained 60% total available alumina, 52% trihydrate available alumina and 8% alumina monohydrate. After digesting the bauxite and liquor for 20 minutes at 150° C., the slurry was cooled to 96° C. and filtered on a No. 1 Whatman paper.

The filtered liquor was placed in a container and analysed for alumina, caustic and $Fe_2O_3$. The mud was washed with water until all caustic was removed and then the mud was dried, weighed and analysed for total available alumina. The filtered liquor in the container was cooled to 26° C., 1 gram of alumina hydrate added and the liquor agitated until alumina hydrate precipitated to give an alumina to caustic ratio in the liquor of 0.38. The alumina hydrate slurry was filtered on a No. 1 Whatman paper, and the filtered liquor analysed for alumina, caustic and $Fe_2O_3$. The alumina hydrate cake was washed with water until all caustic was removed and then the cake was dried, weighed, calcined in an oven at 1200° C. for 2 hours and the alumina cooled, weighed and analysed for $Fe_2O_3$.

The results indicated only a 85% alumina extraction efficiency with a $Fe_2O_3$ content of 0.012% for a conventional low temperature Bayer process.

EXAMPLE 1A 86.8 grams of a West African bauxite of the same composition as used in Example 1 was digested in the laboratory in 1 liter of spent caustic aluminate liquor to a charging A/C ratio of 0.64. The spent caustic aluminate liquor was of the same composition as used in Example 1. After digesting the bauxite and liquor for 20 minutes at 243° C., the slurry was cooled to 96° C., and filtered on a No. 1 Whatman paper.

The filtered liquor was placed in a container and analysed for alumina, caustic and $Fe_2O_3$. The mud was washed with water until all of the caustic was removed and then the mud was dried, weighed, and analysed for total available alumina. The filtered liquor in the container was cooled to 26° C., 1 gram of alumina hydrate added and the liquor agitated until alumina hydrate precipitated to give an alumina to caustic ratio in the liquor of 0.38. The alumina hydrate slurry was filtered on a No. 1 Whatman paper and the filtered liquor analysed for alumina, caustic and $Fe_2O_3$. The alumina hydrate cake was washed with water until all caustic was removed and then the cake was dried, weighed, calcined in an oven at 1200° C. for 2 hours and the alumina was cooled, weighed and analysed for $Fe_2O_3$.

The results indicated an improved 94% alumina extraction efficiency, but an unacceptable 0.035% $Fe_2O_3$ content with a high temperature Bayer process.

EXAMPLE 2

85.3 grams of West African bauxite of the same composition as used in Examples 1 and 1A was digested in the laboratory in 0.84 liters of spent caustic aluminate liquor to a charging A/C ratio of 0.647. The spent caustic aluminate liquor was of the same composition as used in Examples 1 and 1A. After digesting the bauxite and liquor for 20 minutes at 150° C., the slurry was cooled to 96° C. and filtered on a No. 1 Whatman paper.

The filtered liquor was placed in container A. The mud on the paper was hosed into a laboratory digester with 0.16 liters of spent caustic aluminate liquor of the same composition as used in Examples 1 and 1A and to give a charging A/C ratio of 0.60. After digesting the mud and liquor for 20 minutes at 243° C., the slurry was cooled to 96° C. and filtered on a No. 1 Whatman paper. The filtered liquor was added to the liquor in container A and the combined liquor analysed for alumina, caustic and $Fe_2O_3$. The mud residue on the paper was washed with water until all of the caustic was removed and then the mud residue was dried, weighed and analysed for total available alumina.

The filtered liquor in container A was cooled to 26° C., 1 gram of alumina hydrate added and the liquor agitated until alumina hydrate precipitated to give an alumina to caustic ratio in the liquor of 0.38. The alumina hydrate slurry was filtered on No. 1 Whatman paper and the filtered liquor analysed for alumina, caustic and $Fe_2O_3$. The alumina hydrate cake was washed with water until all caustic was removed and then the cake dried, weighed, calcined in an oven at 1200° C. for 2 hours and the alumina cooled, weighed and analysed for $Fe_2O_3$.

The results from the FIG. 2 process of this invention indicated A 96.1% alumina extraction efficiency with a 0.018% $Fe_2O_3$ content.

EXAMPLE 3

54 grams of West African bauxite of the same composition as used in Examples 1, 1A and 2 was digested in the laboratory in 0.6 liters of spent caustic aluminate liquor to a charging A/C ratio of 0.65. The spent caustic aluminate liquor was of the same composition as used in Examples 1, 1A and 2. After digesting the bauxite and liquor for 20 minutes at 150° C., the slurry was cooled to 96° C. and filtered on a No. 1 Whatman paper.

The filtered liquor was placed in container B. The mud on the paper was hosed into a laboratory digester with 0.4 liters of spent caustic aluminate liquor of the same composition as used in Examples 1, 1A and 2. 32.7 grams of West African bauxite of the same composition as used in Examples 1, 1A and 2 was added to the laboratory digester containing the mud and liquor to give a charging A/C ratio of 0.625. After digesting the mixture of mud, bauxite and liquor for 20 minutes at 243° C., the slurry was cooled to 96° C. and filtered on a No. 1 Whatman paper. The filtered liquor was added to the liquor in container B and the combined liquor analysed for alumina, caustic and $Fe_2O_3$. The mud residue on the paper was washed with water until all of the caustic was removed and then the mud residue was dried, weighed and analysed for total available alumina.

The filtered liquor in container B was cooled to 26° C., 1 gram of alumina hydrate added and the liquor agitated until alumina hydrate precipitated to give an alumina to caustic ratio in the liquor of 0.38. The alumina hydrate slurry was filtered on a No. 1 Whatman paper and the filtered liquor analysed for alumina, caustic and $Fe_2O_3$. The alumina hydrate cake was washed with water until all caustic was removed and then the cake was dried, weighed, calcined in an oven at 1200° C. for 2 hours and the alumina cooled, weighed and analysed for $Fe_2O_3$.

The results from the FIG. 3 process of this invention indicates a 95.0% alumina extraction efficiency with a 0.020% $Fe_2O_3$ content.

SUMMARY OF RESULTS FROM EXAMPLES 1, 1A, 2 and 3

Table 1 summarises the results from examples 1, 1A, 2 and 3 of laboratory extraction and production of alumina from a West African bauxite containing 8% alumina monohydrate and 52% alumina trihydrate.

TABLE 1

| EXAMPLE NO. | EXTRACTION EFFICIENCY % | $Fe_2O_3$ in Alumina % |
|---|---|---|
| 1 | 85.0 | 0.012 |
| 1A | 94.0 | 0.035 |
| 2 | 96.1 | 0.018 |
| 3 | 95.0 | 0.020 |

Examples 1 and 1A using the conventional Bayer Process flow sheet, gave in Example 1, a low and uneconomic extraction efficiency of 85.0% and produced an alumina with a low $Fe_2O_3$ content of 0.012%. Example 1A gave a high extraction efficiency of 94.0% but produced an alumina with a very high $Fe_2O_3$ content of 0.035% and is considered to be outside the maximum specification of 0.03% $Fe_2O_3$ for most alumina producers. Using the preferred embodiments of this invention of Examples 2 and 3 resulted in a high extraction efficiency of 96.1% and 95.0%, respectively, and produced an alumina with a low $Fe_2O_3$ content of 0.018 and 0.020%, respectively.

Examples 2 and 3 and FIGS. 2 and 3 demonstrate that the preferred embodiments of this invention can give a higher extraction efficiency compared to a conventional Bayer Process flow sheet as exemplified in Examples 1, 1A and FIG. 1 and also produce an alumina with a low $Fe_2O_3$ content when using the preferred embodiments of this invention.

There are, of course, many obvious alternate embodiments of this invention not specifically mentioned but which are intended to be included in the scope of this invention as defined by the following claims:

What I claim is:

1. A process for extracting from an ore containing alumina wherein said alumina is predominantly in the form of alumina trihydrate, but also wherein said alumina is at least about 5% in the form of alumina monohydrate, the extracted alumina having an $Fe_2O_3$ content of less than 0.03% by weight, which comprises:

(a) digesting in a first reaction vessel at 100°–230° C. a mixture of spent caustic aluminate liquor, and a first portion of said ore for a period of time sufficient to form a first supersaturated caustic aluminate liquor stream and a mud stream, (b) separating said aluminate liquor stream from said mud stream, (c) digesting in a second reaction vessel at a temperature greater than in said first reaction zone but between 200°–300° C. a second portion of said ore, said mud stream, and spent caustic aluminate liquor for a period of time sufficient to form a second supersaturated caustic aluminate stream and a second mud stream, wherein the alumina to caustic weight ratio is between 0.58–0.8, and said mud stream to said second portion of said ore weight ratio is between 0.1 to 2.5, (d) separating said second aluminate stream from said second mud stream, (e) combining said first and second aluminate streams in a third reaction vessel with diluted spent caustic aluminate liquor and alumina hydrate seeding to precipitate out alumina hydrate, and (f) calcining said alumina hydrate to form said alumina.

2. A process according to claim 1 wherein said digesting in said first reaction vessel at 100°–199° C.

3. A process according to claim 2 wherein caustic concentration in said first reaction vessel is 100–400 grams per liter and an alumina to caustic ratio is 0.58–0.80 in said supersaturated caustic aluminate liquor.

4. A process according to claim 3 wherein caustic concentration is 100–250 grams per liter.

5. A process according to claim 1 wherein caustic concentration in said second reaction vessel is 100–400 grams per liter.

6. A process according to claim 5 wherein said caustic concentration in said second reaction vessel is 100–300 grams per liter.

* * * * *

UNITED STATES PATENT AND TRADEMARK OFFICE
CERTIFICATE OF CORRECTION

PATENT NO. : 4,324,769

DATED : April 13, 1982

INVENTOR(S) : James W. McDaniel

It is certified that error appears in the above-identified patent and that said Letters Patent is hereby corrected as shown below:

Column 5, line 8, the word "spend" should read -- spent --;

Column 6, line 40, "separate" should read -- separated --;

Column 6, line 53, "164" should read -- 165 --..

Signed and Sealed this

Twenty-first Day of August 1984

[SEAL]

Attest:

GERALD J. MOSSINGHOFF

Attesting Officer     Commissioner of Patents and Trademarks